US006735657B1

(12) United States Patent
Falk et al.

(10) Patent No.: US 6,735,657 B1
(45) Date of Patent: May 11, 2004

(54) METHOD AND APPARATUS FOR CONNECTING TWO-WIRE SERIAL INTERFACE AND SINGLE-WIRE SERIAL INTERFACE WITH HIGH TRANSMISSION SPEED

(75) Inventors: Peter Falk, Sunnyvale, CA (US); Joseph C. Harrow, San Ramon, CA (US); Wen Huang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 506 days.

(21) Appl. No.: 09/608,420

(22) Filed: Jun. 30, 2000

(51) Int. Cl.$^7$ .............................................. G06F 13/14
(52) U.S. Cl. ...................................... 710/305; 710/310
(58) Field of Search ................................ 710/305, 310, 710/105, 106, 18, 8–14

(56) References Cited

U.S. PATENT DOCUMENTS

| | | | | |
|---|---|---|---|---|
| 4,178,485 A | * | 12/1979 | Cowpland et al. | 379/382 |
| 5,007,050 A | | 4/1991 | Kasparian et al. | 370/77 |
| 5,280,596 A | * | 1/1994 | Van Berkel et al. | 365/189.01 |
| 5,710,890 A | * | 1/1998 | Hermer | 710/106 |
| 5,889,480 A | | 3/1999 | Kim | 341/50 |
| 5,912,895 A | * | 6/1999 | Terry et al. | 370/445 |
| 6,182,180 B1 | * | 1/2001 | Liu et al. | 710/310 |
| 6,308,215 B1 | * | 10/2001 | Kolbet et al. | 709/233 |

OTHER PUBLICATIONS

AMD Product Brief; AM79Q02/021/031 (PCM only) and AM79Q06/061/062/063 (PCM/GCI) Quad Subscriber Line Audio–Processing Circuits: http://www.amd/com/products/cpd/prodover/wan/2004.html; pp. 1–3.

* cited by examiner

Primary Examiner—Sumati Lefkowitz
Assistant Examiner—X. Chung-Trans
(74) Attorney, Agent, or Firm—Hickman Palermo Truong & Becker LLP

(57) ABSTRACT

A two-wire interface having a receive wire and a transmit wire is coupled for communication with a single-wire serial interface to provide for relatively high-speed data transmission. In one aspect, controllable buffers are coupled to the transmit and receive lines of the two-wire serial interface. The outputs from the two buffers are coupled to a commnon line which is also coupled to the single line of the single-wire interface. The transmit buffer and/or read buffer and/or transmission from the single-wire interface are controlled, e.g., such as using control signals provided by software, such that the transmit buffer from the two-wire interface is enabled only when transmission from the single-wire interface is disabled and transmission from the single-wire interface is permitted only when the transmit buffer of the two-wire interface is disabled. By this type of system, it is possible to avoid coupling which involves a pull-up transistor and the like, avoiding lengthening the rise time or fall time of signals and providing the potential for relatively high data transmission rates such as 1 Mbps or more.

21 Claims, 2 Drawing Sheets

METHOD AND APPARATUS FOR CONNECTING TWO-WIRE SERIAL INTERFACE AND SINGLE-WIRE SERIAL INTERFACE WITH HIGH TRANSMISSION SPEED

The present invention relates to connecting two or more serial interfaces and in particular a two-wire TX/RX interface, as commonly found on a computer CPU, to a one-wire interface so as to provide high data transmission speeds.

BACKGROUND INFORMATION

Many electronic devices or components include one or more interfaces for transmitting and/or receiving data in a serial fashion. One example is a computer central processing unit (CPU) which typically includes a two-wire serial interface, providing a first wire or pin for data transmit and a second wire or pin for data receive purposes.

The two-wire or two-pin serial interface is by no means a universal configuration. It is not uncommon to use electronic devices or components having one or more serial interfaces which provide only a single wire or pin for data. Those of skill in the art will understand that, while a device or component may provide a single wire or pin for serial transmission of data in both directions (both transmit and receive) or can have a two-wire serial interface configuration (providing a first wire or pin for transmit of serial data and a second wire or pin for receipt of serial data) the interface, component or device may have numerous other wires or pins including, e.g., power, ground, control pins or wires and the like. While an electronic device or component may have a particular type of serial interface, such as a one-wire serial interface or two-wire serial interface, it is not uncommon for devices or components to also have other interfaces such as numerous serial interfaces, one or more parallel interfaces, wireless links and the like.

One example of a one-wire serial interface is the interface provided in at least some audio processing circuits such as that sold under the trade name Quad Subscriber Line Audio Processing Circuit (QSLAC) available from Advanced Micro Devices (AMD).

In some circumstances, it is desired to provide for both read and write serial communication between the two wire serial interface and a single wire serial interface. As will be understood by those of skill in the art, read and write operations at the two interfaces are complementary in the sense that an operation which represents a write operation at the two-wire interface, is a read operation at the one-wire interface and vice versa. One possible approach is to connect the wires or pins of the two wire interface, pulled up to a desired voltage (such as Vcc) with a resistor. It has been found, however, that this configuration can lead to relatively low limits on the speed of data transmission, especially when the single wire is used for both transmit and receive directions.

Accordingly, it would be useful to provide a system, method and apparatus for providing communication between a two wire serial interface and a single wire interface at relatively high data transmission speeds. Preferably, such a system, method and apparatus can be implemented at relatively low cost, such as by using at least some components which are already present in the system (e.g., for another purpose).

SUMMARY OF THE INVENTION

The present invention includes a recognition of the existence, nature and/or source of problems in previous approaches, including as described herein.

In one aspect, the present invention provides a connection between a two-wire serial interface and a one-wire serial interface which substantially avoids more than one current source being active or connected at any given time. In one embodiment, a control device, which may be a CPU, under the control of microprogramming or other software, controls the interfaces so as to avoid both write sources (or current sources) being active and/or connected at the same time.

In one embodiment, each wire or pin of a two-wire serial interface is provided to a controllable buffer, controlled by a control signal. The CPU or other control device assures that the write buffer is off or inactive during any time that the one-wire serial interface is able to transmit or write.

In one embodiment, the single-wire interface is configured such that transmit or write operations cannot be performed until a write-enable (or similar signal) is received, e.g., from a CPU, i.e. the same control device which controls the buffers of the two-wire interface. Accordingly, the control device will preferably inhibit the write buffer of the two-wire serial interface whenever a write-enable is sent to, or effective at, the single-wire interface and similarly the control device will disable write capability at the single-wire interface whenever the write buffer of the two-wire interface is enabled.

By providing for selective enablement/disablement of write capabilities, the present invention can avoid the approach of using a "mixer", such as a pull-up resistor on the common line. By eliminating the need for a pull-up resistor or similar device, it is possible to avoid unduly long rise-times or fall-times and, in this way, relatively high digital signal transmission rates can be provided.

In one aspect, a two-wire interface having a receive wire and a transmit wire is coupled for communication with a single-wire serial interface to provide for relatively high-speed data transmission. In one aspect, controllable buffers are coupled to the transmit and receive lines of the two-wire serial interface. The outputs from the two buffers are coupled to a common line which is also coupled to the single line of the single-wire interface. The transmit buffer and/or read buffer and/or transmission from the single-wire interface are controlled, e.g., such as using control signals provided by software, such that the transmit buffer from the two-wire interface is enabled only when transmission from the single-wire interface is disabled and transmission from the single-wire interface is permitted only when the transmit buffer of the two-wire interface is disabled. By this type of system, it is possible to avoid coupling which involves a pull-up transistor and the like, avoiding lengthening the rise time or fall time of signals and providing the potential for relatively high data transmission rates. In one aspect, the increase in data transmission speed is roughly proportional to the rise time and/or fall time (or combination thereof) of the signal. The rise time/fall time is generally proportional to the current source/sink ability of the drivers and inverse to the pull-up resistor value. A typical increase in transmission speed, according to an embodiment of the invention is one to two orders of magnitude, such as an increase from about 40 kilobits per second (kbps) to about 1 megabits per second (Mbps), prefer about 2 Mbps.

DETAILED DESCRIPTION OF THE PREFERRED EMBODIMENT

Figure 1:
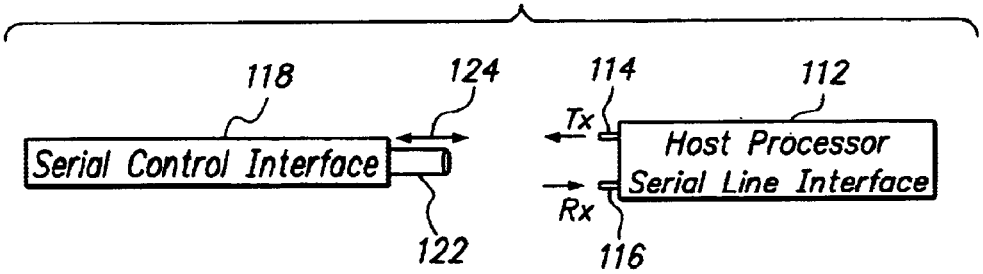
FIG. 1 is a block diagram depicting a two-wire interface and a single-wire interface.

As depicted in FIG. 1, the serial interface 112 of a host processor such as a CPU, microcontroller or the like, often has separate wires for transmission (writing) 114 and receiving (reading) 116. In contrast, other serial interfaces 118 have a single pin or wire 122 which provides for both transmitting and receiving data 124 (preferably at different times).

As noted above, in some circumstances, it is desirable to provide for serial communication between a two-wire serial interface 212 and a single-wire interface 218. In the approach depicted in FIG. 2, the transmit and receive wires or pins 214, 216 of the two wire interface are tied or wired together 226 and connected 228 to the single wire or pin 222 of the single-wire interface 218. Accordingly, it is possible for the common wire 232 to receive current from two sources of current, i.e., the write pin 214 and the single-wire 222 of the single-wire interface 218 (during a write operation from the single-wire interface). In one approach, a system is devised that permits each of the current sources 222, 214 to overpower the other. One way of doing this is to use a pull up resistor 234 to pull up the common wire 232 to a desired voltage such as Vcc 236.

Figure 2:
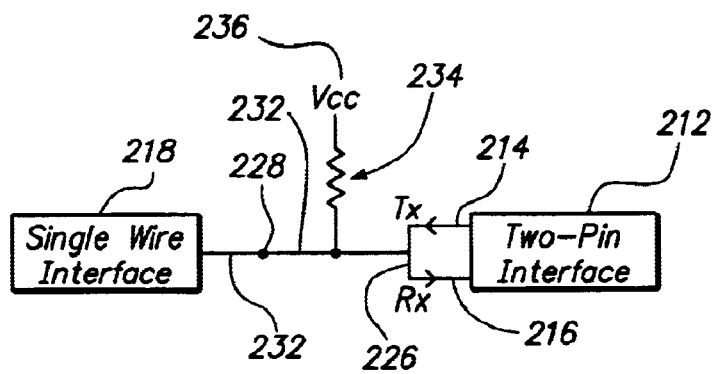
FIG. 2 is a block diagram depicting a connection between a two-wire interface and a single-wire interface according to previous approaches.

While the configuration depicted in FIG. 2 is operable in at least some applications, the resistance provided by resistor 234 can disadvantageously affect signal rise time (the time it takes to drive the wire from low to high states) and/or fall-time (the time it takes to fall from a high state to a low state). A relatively high value for the resistor 234 provides relatively slow rise time (such as greater than about 10–20 microseconds (ms)) while a relatively low resistance provides relatively slow fall time (such as greater than about 10–20 ms). In practice, the value for the resistor 234 represents something of a compromise, so that the effective transmission rate in the system of FIG. 2 is often relatively low. In at least some previous embodiments, the maximum achievable transmission rate using a system similar to that depicted in FIG. 2 has been about 0.005 Mbps.

Figure 3:
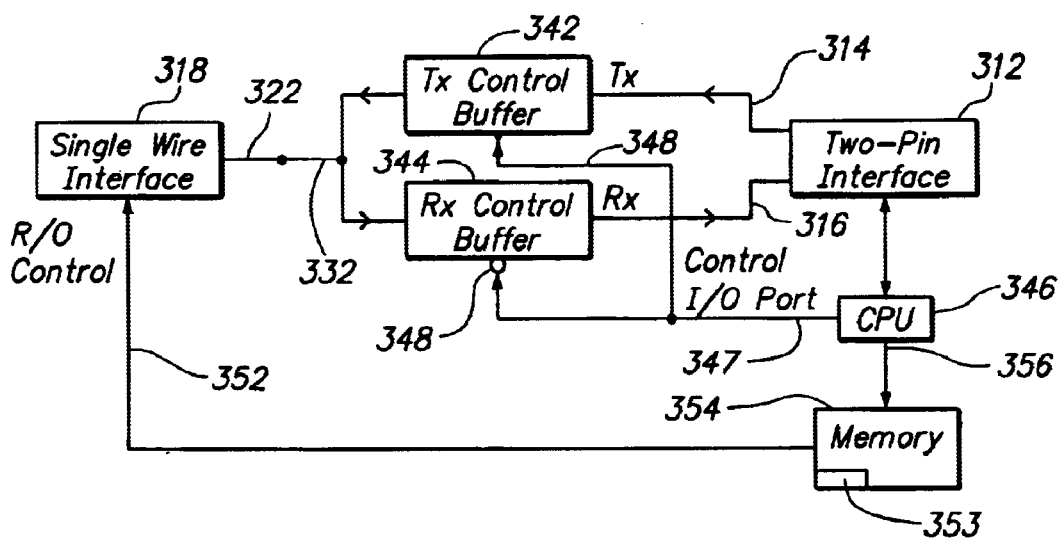
FIG. 3 is a block diagram depicting a connection between a two-wire interface and a single interface according to an embodiment of the present invention.

In the embodiment depicted in FIG. 3, the two wires or pins of a two-wire or two-pin interface 312 are coupled to controllable transmit and receive components such as control buffers 342, 344. As will be understood by those of skill in the art, a number of devices can be used as control buffers. The control buffers are tied together to a common line 332 connected to the single wire or single-pin 322 of the single-wire interface 318. As shown in the embodiment of FIG. 3, there is no need for a pull-up resistor on the common line 332, of the type depicted in FIG. 2. In the embodiment of FIG. 3, there is a connection from a control I/O port 347 of a control device such as a CPU 346, micro-controller or the like, to an enable or control input 348 of the transmit buffer 342. As one example, the CPU 346 can be a Motorola 855T micro-controller. The control line, in the embodiment of FIG. 3, is also provided to a control input of the receive buffer 344 via an inverter 348. In this way, the transmit control buffer 342 is in an "on" or enabled state only when the receive buffer 344 is in an "off" or disabled state, and vice versa.

In the embodiment of FIG. 3, the single-wire interface 318 also receives a control signal 352, in this case a read/write or write-enable signal. In one embodiment, the single-wire interface 318 cannot write or transmit on the single wire 322 unless and until it has received a write-enable or "write" signal on the control line 352. In the depicted embodiment, the control line 352 is coupled to a location in memory 354 which is accessible 356 from the control device or CPU 346. Those of skill in the art will understand how to select, connect and use components depicted in the block diagram of FIG. 3, including transmit and receive control buffers inverters and the like, after understanding the present disclosure.

Figure 4:
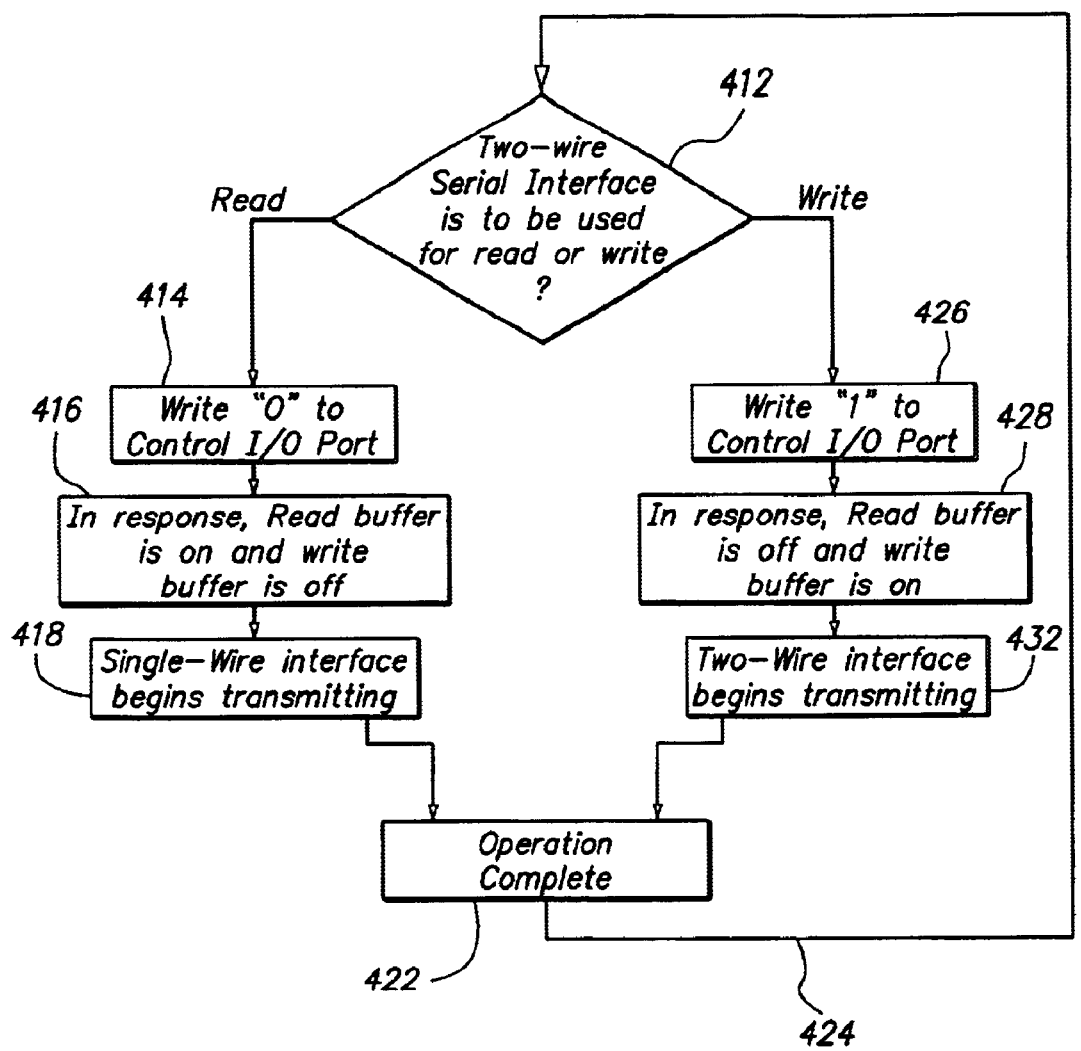
FIG. 4 is a flowchart depicting read and write operations to and from the single-wire interface according to an embodiment of the present invention.

As depicted in FIG. 4, in operation, when the interface is to be used, the system determines whether the single-wire interface 318 is to be used for reading (receiving) or writing (transmitting) data 412. If a single wire interfaces to be receiving data, the CPU 346 writes or outputs 414 a zero, or low, value to the control I/O port 347. In response, the read buffer 344 receives the inverted or "one" signal and is placed in an "on" or enabled state, while the write control buffer 342 receives the low or zero signal and is placed in an "off" or disabled state 416. Preferably, the CPU also sends an enable signal to the single-wire interface. For example, in the embodiment of FIG. 3, the CPU 346 writes a predetermined "write enable" value to a location 353 in memory 354 which is coupled 352 to the control port of the single-wire interface 318. Thereupon, the single-wire interface can begin transmitting 418. The system will remain in this state (with the single-wire interface 318 configured to permit writing or transmitting over the single wire 322, to wire 332, into the receive control buffer 344, to be provided to the receive pin 316 of the two-pin interface 312) until any of a number of events occurs. For example, the write operation may be complete 422 and the system returns 424 to await the beginning of the next read or write operation. Preferably, when the write operation is complete 422, the single wire interface 318 provides an indication of this condition, ultimately to the CPU 346, such as by transmitting a "write complete" message or signal over the data path 322, 344, 316, 312. Other events can also cause the read operation (two wire interface) to be terminated such as the detection of certain types of error events, occurrence of high priority interrupt events and the like. When the read operation is complete 422, the system can remain in the read configuration until such time as a new operation is requested, or the system configuration can be changed, such as by removing the write-enable signal 352, (or sending a write-disable signal).

In a situation involving a write or transmit from the two wire interface, the control device 346 will write a high or "one" value 426 to the control I/O port 347. This high or one value will result in the transmit control buffer 342 being placed in an enable or "on" configuration and the inverted 348 value will place the receive buffer 344 in an "off" or disabled state 428. Preferably, the CPU will assure that a write-enable signal is not being provided to the control input or line 352 for the single-wire interface 318. The CPU 346 will control the two-pin interface 312 to transmit the desired signal on the transmit pin 314, to the (enabled) transmit control buffer 342, onto the common line 332 and to the single wire 322 of the single wire interface 318 to achieve data transmission 432. This state of the system will be maintained, e.g., until the operation is complete 422 or some other event dictates termination of a write operation (such as an error event, high priority interrupt and the like).

In light of the above description, a number of advantages of the present invention can be seen. The present invention provides an operable fashion of connecting a two-wire serial interface and a one-wire serial interface to achieve effective communication. The present invention can provide communication between a two-wire serial interface and a single-wire interface substantially without the need for a pull-up resistor such as a pull-up to Vcc or the like. The present invention can provide a connection between a two-wire serial interface and a single-wire serial interface which provides (preferably bi-directional) communications therebetween at a relatively high data rate such as about 5 Megabits per second (Mbps) or more. The present invention can be implemented while making use of at least some devices which are already common or present in systems having single-wire and two-wire serial interfaces, such as using the SPI bus of a micro-controller.

A number of variations and modifications of the present invention can be used. It is possible to use some aspects without using others. For example, it is possible to use the CPU or other control device for controlling two-wire interface buffers without directly controlling operation of the single-wire interface. Although a computer CPU has been described as one example of a electronic device having a two wire serial interface, numerous other electronic devices can have two wire serial interfaces including, for example, network components such routers, bridges, hubs, gateways, switches and the like. Although an audio processing circuit has been described above as one example of an electronic device or component having a single wire serial interface, numerous other electronic devices or components may have single wire serial interfaces including, for example, Ethernet transceivers or Integrated Services Digital Network (ISDN) transceivers and telephone or telecommunications devices in general. Although it is preferred to select between read configurations and write configurations using software control, it is also possible to provide hardware control for this purpose. Although separate transmit and receive buffers have been depicted, it is also possible to provide a single transmit/receive buffer which can be changed from a transmit buffer configuration to a receive buffer configuration. Although transmit and receive buffers have been depicted as a way to prevent performing write operations from the two-wire interface while writes are enabled on the one-wire interface, it is also possible to provide other devices for this purpose, in place of control buffers, such as using NAND gates, OR-gates and/or discrete transistors. The present invention can be implemented in the context of devices or components which have only one two-wire serial interface and only one single-wire serial interface, or in the context of devices which have numerous single-wire serial interfaces and/or numerous two-wire serial interfaces. When more than one serial interface is provided, it is possible to implement embodiments of the present invention in which only one of these single-wire interfaces and one of the two-wire interfaces are connected as described herein, or in which more than one, or all, interfaces are connected as described herein.

Although in the depicted embodiment, a single control line, one of which is coupled to an inverter, controls both buffers of the two wire interface, there is no theoretical reason why a device according to the present invention could not be provided with two different control lines for controlling the two buffers of the two wire interface. Although the depicted embodiment provides a configuration in which the CPU can effectively send a write-enable signal to the one-wire interface, it is also possible to provide embodiments in which the one-wire interface can send a signal to the CPU requesting or demanding write permission. It is also possible to provide negotiation circuitry in the first and second interfaces allowing the interfaces themselves to negotiate for authority to perform a transmit or write operation (e.g., without using or involving the CPU). It is also possible to provide predetermined periods of time (or changeable patterns of time periods) during which the one-wire interface and two-wire interface, respectively, have write permission and/or have write request priority. Although the present invention allows a two wire serial interface and a single wire interface to be connected without the need for a pull-up resistor, or otherwise in a fashion to provide high transmission rates, it is possible to provide embodiments in which some pull-up or other resistance is provided, although this will typically limit the signal or data transmission rate. Although the depicted embodiment shows the read/write control for the single-wire interface being different from the control 344 for the two pin interface 312, it is also possible to use the same (inverted) signal 348 provided to the receive buffer, as the read/write control signal to the single wire interface 318.

Although the depicted embodiment shows the control line for the single-wire interface being connected to a memory location, it is also possible to connect to another component or device which can be controlled or accessed by the CPU or other control device, such as a register.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for providing bi-directional communication between a first serial interface having a single data communication wire and a second serial interface having a data transmit wire and a data receive wire, the apparatus comprising:

a first buffer coupled to said data transmit wire of said second serial interface, said first buffer having an output line;

a second buffer coupled to said data receive wire of said second serial interface said second buffer being controllable, in response to a control signal, to change from a first, enabled configuration to a second, disabled configuration, said second buffer having an output line; and a common line coupled to said output line of said first buffer, said output of said second buffer and said single line of said first serial interface.

2. Apparatus, as claimed in claim 1, further comprising a control device which outputs control signals for placing at least one of said first and second buffers in a disabled state.

3. Apparatus, as claimed in claim 2, wherein said control signal places said first and second buffers in opposite states.

4. Apparatus, as claimed in claim 1, further comprising a control device which outputs a control signal which controls said first serial interface to be in either a first state, permitting data to be output on said single data communication wire of said first serial interface, or a second state, disabling transmitting of data on said single data communication wire of said first serial interface.

5. Apparatus, as claimed in claim 4, wherein said control signal is selected such that output from said first serial interface is enabled only when transmitting from said second serial interface is disabled.

6. Apparatus, as claimed in claim 4, wherein said control device is selected from among a CPU of a computer and a micro-controller.

7. Apparatus, as claimed in claim 4, wherein said control signal for said first serial interface is provided by writing data to one of a memory location and a register.

8. Apparatus, as claimed in claim 1, wherein said common line is provided in the absence of a pull-up resistor.

9. Apparatus, as claimed in claim 1, wherein data is transferred between said first and second interfaces at a transmission speed of at least 1 Mbps.

10. Apparatus, as claimed in claim 1, wherein the rise time for transmission of a bit over said common line is less than about 500 nanoseconds and fall time for data transmitted over said common line is less than about 500 nanoseconds.

11. Apparatus, as claimed in claim 1, wherein said second serial interface is a serial interface of a microcontroller chip.

12. Apparatus, as claimed in claim 1, wherein said apparatus is used in telephone communications equipment.

13. Apparatus, as claimed in claim 1, wherein said apparatus is used in audio processing.

14. A method for communicating between a two-wire serial interface and a one-wire serial interface comprising:

coupling first and second controllable buffers to data receive and transmit wires, respectively, of said two-wire interface;

coupling a common wire to outputs of said first and second controllable buffers;

coupling said common wire to a single wire of said one-wire serial interface; and providing a first control signal to at least said second controllable buffer coupled to said transmit wire to disable transmission from said second controllable buffer coupled to said transmit wire when transmitting is enabled for said one-wire serial interface.

15. A method, as claimed in claim 14, further comprising disabling transmission from said one-wire serial interface when enabling transmission from said second controllable buffer coupled to said transmit wire of said two-wire serial interface.

16. Apparatus for communication between a two-wire interface and a one-wire interface comprising:

first buffer means, coupled to a transmit wire of said two-wire interface, for at least temporarily storing transmit data;

second buffer means, coupled to a receive wire of said two-wire interface, for at least temporarily storing receive data;

control means, coupled to at least said first buffer means, for configuring said first buffer means either in an enabled configuration or a disabled configuration in response to a control signal; and control signal means for providing said control signal so as to disable said first buffer means, at least while data is transmitted from said one-wire interface.

17. Apparatus, as claimed in claim 16, further comprising means for enabling transmission from said one-wire interface only when said two-wire interface is disabled from placing transmission signals on a common wire coupled to an output of the first buffer means, an output of the second buffer means and the one-wire interface.

18. Apparatus for providing communication between a two-wire serial interface and a single-wire serial interface comprising:

first means for at least indirectly coupling a wire of said single-wire serial interface to a transmit wire of said two-wire serial interface;

second means for at least indirectly coupling said wire of said single-wire serial interface to a receive wire of said two-wire serial interface; and wherein communication at a transmission speed of at least about 2 Mbps is provided.

19. Apparatus, as claimed in claim 18, wherein said first means includes a controllable buffer.

20. Apparatus, as claimed in claim 18, wherein said second means comprises a controllable buffer.

21. Apparatus, as claimed in claim 18, further comprising means for disabling said first means, at least when data is transmitted from said single-wire serial interface.

* * * * *